(12) United States Patent
Chen et al.

(10) Patent No.: US 7,813,456 B2
(45) Date of Patent: Oct. 12, 2010

(54) FREQUENCY CORRELATION BASED SYNCHRONIZATION FOR COHERENT OFDM RECEIVER AND APPARATUS THEREOF

(75) Inventors: Ching-Yung Chen, Hsinchu (TW); Yi-Ting Wang, Hsinchu (TW); Yung-Hua Hung, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 940 days.

(21) Appl. No.: 11/259,212

(22) Filed: Oct. 26, 2005

(65) Prior Publication Data

US 2006/0088116 A1    Apr. 27, 2006

Related U.S. Application Data

(63) Continuation-in-part of application No. 11/153,105, filed on Jun. 15, 2005.

(60) Provisional application No. 60/620,725, filed on Oct. 22, 2004.

(51) Int. Cl.
*H04L 27/06* (2006.01)
(52) U.S. Cl. .................. 375/343; 375/150; 375/260
(58) Field of Classification Search ......... 375/140–157, 375/260, 316, 343
See application file for complete search history.

(56) References Cited

U.S. PATENT DOCUMENTS 6,098,161 A * 8/2000 Kim .................. 711/220
6,470,030 B1 * 10/2002 Park et al. .......... 370/480
7,016,298 B2 * 3/2006 Akiyama et al. ......... 370/206
7,016,426 B1 * 3/2006 Balz et al. .............. 375/261
7,027,429 B2 * 4/2006 Laroia et al. ........... 370/350
7,292,651 B2 * 11/2007 Li ........................ 375/316
7,362,832 B2 * 4/2008 Yoshida ................ 375/348
2002/0034213 A1 * 3/2002 Wang et al. ........... 375/132
2002/0061076 A1 * 5/2002 Seki et al. ............. 375/316
2002/0144294 A1 * 10/2002 Rabinowitz et al. ..... 725/139

(Continued)

FOREIGN PATENT DOCUMENTS

EP    1 480 401 A    11/2004

(Continued)

OTHER PUBLICATIONS

Schwoerer, L., et al., "Fast Scattered Pilot Synchronization for DVB-T and DVB-H", *Proc. 8th International OFDM Workshop*, Hamburg, Germany, Sep. 2003.

(Continued)

*Primary Examiner*—Temesghen Ghebretinsae
(74) *Attorney, Agent, or Firm*—Alston & Bird LLP

(57) ABSTRACT

An apparatus for synchronizing pilots contained in symbols received by a receiver in a multicarrier transmission system and a method thereof are provided. Frequency or Time-frequency correlation-based scheme, with exploitation of time-frequency correlation characteristics of the pilots, may be used for identifying the positions of the pilots in frequency or time and frequency dimensions consisting of received symbols. In one example, the apparatus includes a pilot compensator and a signal selector for determining at least one correlation set, a correlator for generating one correlation set result for each of the correlation set, and a judgment or processing unit for determining positions of the pilots in response to the correlation set result.

17 Claims, 13 Drawing Sheets

U.S. PATENT DOCUMENTS

| | | | |
|---|---|---|---|
| 2002/0196731 A1* | 12/2002 | Laroia et al. | 370/206 |
| 2003/0072395 A1* | 4/2003 | Jia et al. | 375/341 |
| 2004/0013172 A1* | 1/2004 | Hashiguchi et al. | 375/148 |
| 2004/0071221 A1* | 4/2004 | Nakada et al. | 375/260 |
| 2004/0137863 A1* | 7/2004 | Walton et al. | 455/130 |
| 2004/0141570 A1* | 7/2004 | Yamazaki et al. | 375/340 |
| 2004/0146003 A1* | 7/2004 | Schaefer et al. | 370/206 |
| 2004/0228270 A1* | 11/2004 | Chen et al. | 370/210 |
| 2004/0246998 A1* | 12/2004 | Ma et al. | 370/527 |
| 2005/0036564 A1* | 2/2005 | Peter et al. | 375/260 |
| 2005/0063298 A1* | 3/2005 | Ling et al. | 370/208 |
| 2005/0073949 A1* | 4/2005 | Hayashi | 370/208 |
| 2005/0099939 A1* | 5/2005 | Huh et al. | 370/210 |
| 2005/0152326 A1* | 7/2005 | Vijayan et al. | 370/343 |
| 2006/0056280 A1* | 3/2006 | Ido et al. | 370/208 |
| 2006/0116095 A1* | 6/2006 | Henriksson | 455/223 |
| 2006/0166634 A1* | 7/2006 | Ido | 455/277.1 |
| 2006/0182063 A1* | 8/2006 | Ma et al. | 370/331 |
| 2007/0036231 A1* | 2/2007 | Ido | 375/260 |
| 2007/0041456 A1* | 2/2007 | Jahan et al. | 375/260 |
| 2007/0053281 A1* | 3/2007 | Schwoerer | 370/208 |
| 2007/0053448 A1* | 3/2007 | Schwoerer et al. | 375/260 |
| 2007/0053473 A1* | 3/2007 | Palin | 375/355 |
| 2007/0064588 A1* | 3/2007 | Kisoda et al. | 370/208 |
| 2007/0104280 A1* | 5/2007 | Ibrahim et al. | 375/260 |
| 2007/0263743 A1* | 11/2007 | Lee et al. | 375/267 |

FOREIGN PATENT DOCUMENTS

| | | |
|---|---|---|
| WO | WO 02/78280 A2 | 10/2002 |

OTHER PUBLICATIONS

Schwoerer, L., "Fast Pilot Synchronization Schemes for DVB-H", *Proc. Wireless and Optical Communications,* Banff, Canada, pp. 420-424, Jul. 2004.

Peng, Dandan "Research of OFDM Theory, Synchronization, Channel Estimation and De-Mapping Algorithm," Master Thesis, Feb. 2004.

* cited by examiner

FIGURE 5 (EMBODIMENT A OF TIME-FREQUENCY CORRELATION-BASED SCHEME)

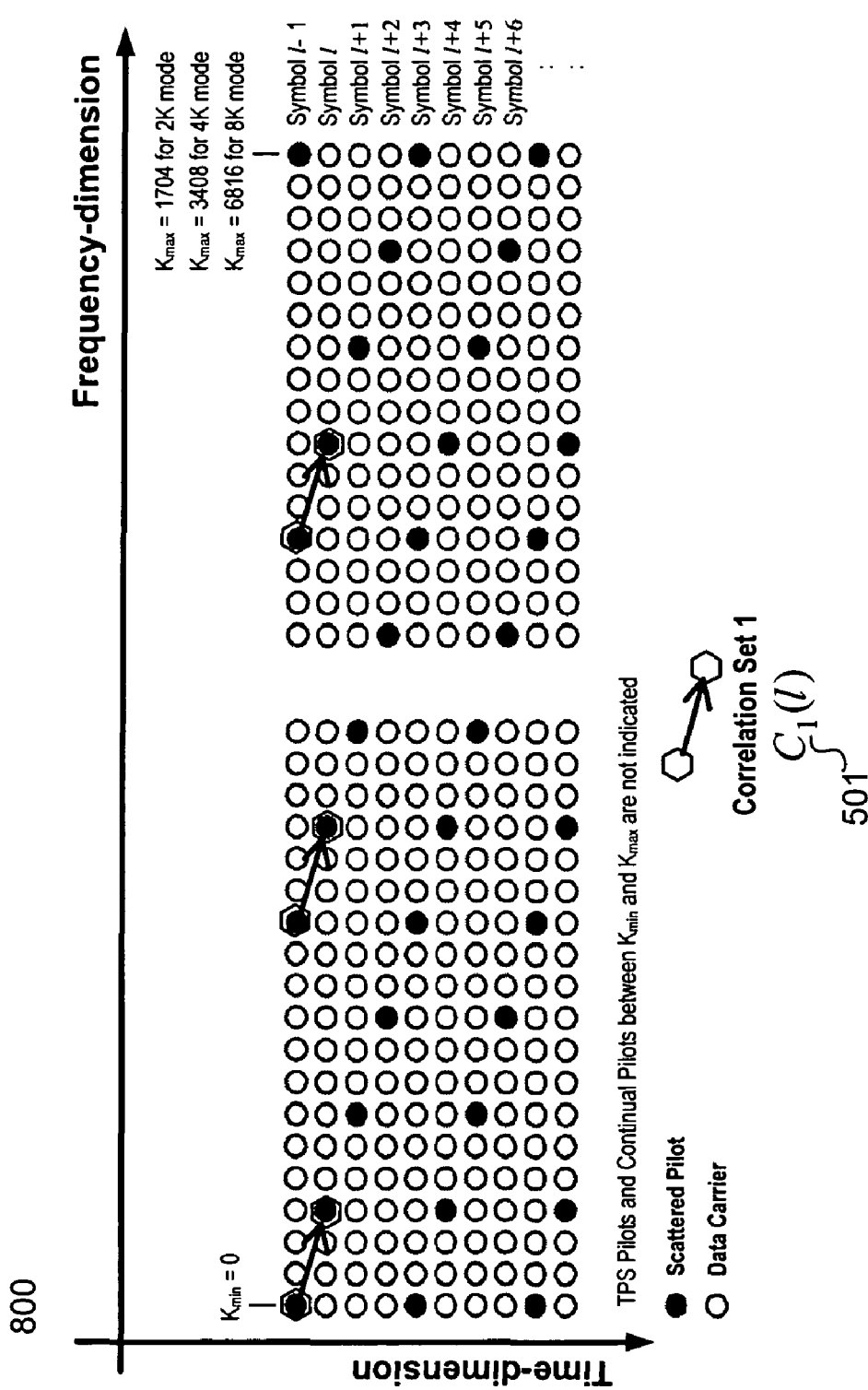
FIGURE 8 (EMBODIMENT B OF TIME-FREQUENCY CORRELATION-BASED SCHEME)

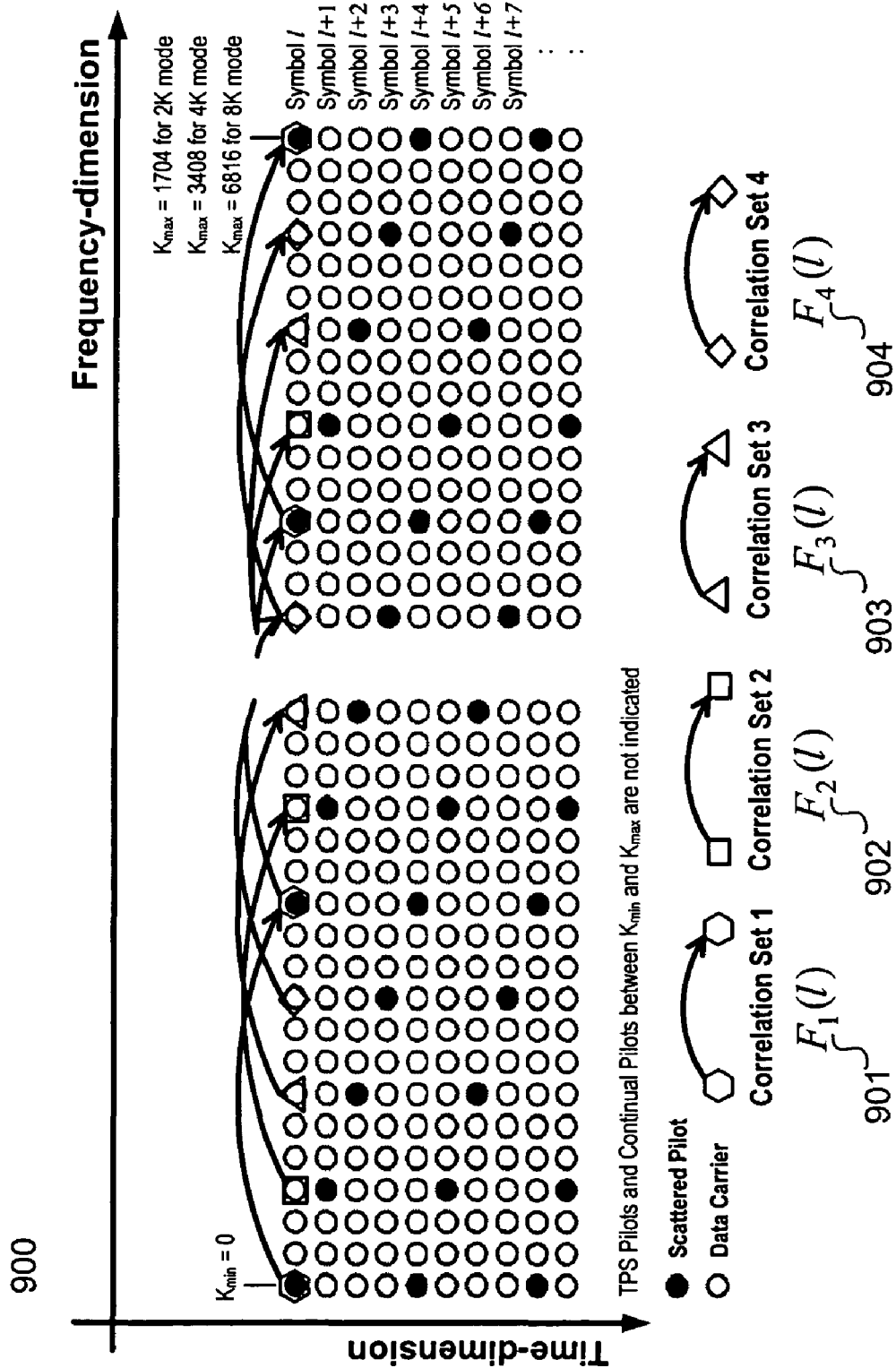
FIGURE 9 (EMBODIMENT A of FREQUENCY CORRELATION-BASED SCHEME)

FIGURE 11 (EMBODIMENT B of FREQUENCY CORRELATION-BASED SCHEME)

FREQUENCY CORRELATION BASED SYNCHRONIZATION FOR COHERENT OFDM RECEIVER AND APPARATUS THEREOF

CROSS-REFERENCE TO RELATED APPLICATIONS

This application is a continuation-in-part application of U.S. patent application Ser. No. 11/153,105, titled "TIME-FREQUENCY CORRELATION-BASED SYNCHRONIZATION FOR COHERENT OFDM RECEIVER" and filed on Jun. 15, 2005, which claimed the benefit of U.S. Provisional Application No. 60/620,725, titled "FAST SYNCHRONIZATION FOR COHERENT OFDM DEMODULATORS" and filed on Oct. 22, 2004.

BACKGROUND OF THE INVENTION

The present invention generally relates to digital broadcasting systems. More particular, the present invention relates to frequency or time-frequency correlation-based synchronization for coherent Orthogonal Frequency Division Multiplexing (OFDM) receivers in a multi-carrier digital broadcasting system, such as Digital Video Broadcasting-Terrestrial (DVB-T), Digital Video Broadcasting-Handheld (DVB-H), and Integrated Service Digital Broadcasting-Terrestrial (ISDB-T) system.

OFDM transmission technique, being one kind of the multi-carrier modulation schemes, has been widely applied for modern high-data-rate digital communications and broadcasting due to its extreme efficacy on dealing with the multipath propagation effects. The OFDM technique has been adopted by several broadcasting systems such as Digital Audio Broadcasting (DAB), DVB-T, DVB-H and ISDB-T, and, moreover, by local area networks such as the HiperLAN/2 and IEEE 802.11a/g/n. Specifically, the (inverse) fast Fourier transform (FFT) technique is employed in an OFDM transmission system for efficiently implementing multi-carrier modulation and demodulation.

For coherent OFDM-based systems such as the DVB-T/H and ISDB-T systems, certain scattered pilots (known as SPs hereinafter) regularly posited in time- and frequency-dimensions are transmitted with predetermined known values together with information data at OFDM transmitters' end and used for channel estimation and equalization at OFDM receivers' end. Referring to FIG. 1, a diagram illustrating positions of SPs defined in DVB-T/H systems with respect to the time-frequency dimension in the frequency domain is provided. The positions of SPs in DVB-T/H systems can be expressed as follows:

For the OFDM symbol of index l (ranging from 0 to 67), carriers for which index k belongs to the subset $\{k=K_{min}+3\times(l \mod 4)+12p|p \text{ integer, } p \geq 0, k \in [K_{min}, K_{max}]\}$ are SPs, wherein p is an integer that takes all possible values greater than or equal to zero, provided that the resulting value for k does not exceed the valid range $[K_{min}, K_{max}]$. $K_{max}$ is 1704 for the 2K mode, 3408 for the 4K mode and 6816 for the 8K mode as defined by DVB-T/H standards.

The positions of the SPs should be detected and identified by means of a synchronization sequence (or synchronization procedure) at a coherent OFDM receiver. Assume that the received Radio Frequency (RF) signal is first down converted to the baseband using a tuner and a carrier recovery loop. A typical DVB-T/H baseband synchronization sequence 20 is illustrated in FIG. 2. After the start-up, pre-FFT synchronization is performed in step 21 in which all metrics are derived in time-domain from guard interval correlation. The baseband signal is then transformed to the frequency-domain through FFT. Subsequently, post-FFT synchronization is performed in frequency-domain in step 22 based on correlating the Continual Pilots (CP) of two consecutive OFDM symbols. Specifically, the pre-FFT and post-FFT synchronization blocks perform the sampling clock, OFDM symbol timing and carrier frequency synchronization.

After sampling clock, OFDM symbol timing and carrier frequency synchronization have been achieved via the pre-FFT and post-FFT synchronization, the positions of the SPs within an OFDM symbol has to be determined before channel estimation can be performed in step 24. As shown in FIG. 2, Transmission Parameters Signaling (TPS) decoding procedure is utilized in step 23 which determines the positions of the SPs by detecting a frame boundary as the scattered pilot positions (known as SPPs hereinafter) are directly related to the OFDM frame. The detection of the frame boundary is so-called "frame synchronization." Typically, the frame synchronization takes a variable synchronization time of 68~136 OFDM symbols, 68~136 $T_{OFDM}$, which is around 50%~70% of the overall synchronization time associated with the total synchronization procedure 20. Thus, the conventional frame synchronization is considerably time-consuming. In particular, for DVB-H time-slicing purposes of burst-mode transmission, the receiver may prepare for the required frame synchronization time even longer than the data burst duration of interest. Therefore, the conventional frame boundary detection based SPPs identification (or SPs synchronization) scheme is especially inefficient in the sense of power reduction for receiving the time-sliced DVB-H signals.

BRIEF SUMMARY OF THE INVENTION

In one example, a method for synchronizing pilots contained in symbols received by a receiver in a multicarrier transmission system is provided. The pilots have predetermined known values, are posited among data carriers in a frequency dimension containing the received symbols, and have a predetermined position pattern in the frequency dimension. The predetermined position pattern may include a finite number of sub-position patterns each corresponding to positions of pilots contained in one of the symbols. The method may include: determining at least one correlation set in the frequency dimension between two sub-carriers of at least one symbol; generating a correlation set result in response to each the correlation set; and determining positions of the pilots in the frequency dimension in response to the correlation set results.

In another example, an apparatus for synchronizing pilots contained in symbols received by a receiver in a multicarrier transmission system is provided. The pilots have predetermined known values, are posited among data carriers in a frequency dimension containing the received symbols, and have a predetermined position pattern in the frequency dimension. The predetermined position pattern may include a finite number of sub-position patterns each corresponding to positions of pilots contained in one of the symbols such that at least one correlation set in the frequency dimension between at least two sub-carriers of at least one symbol can be determined. The apparatus includes: a pilots compensator and a signal selector for determining the at least one correlation set; a correlator for generating one correlation set result for each of the correlation set; and a processing unit for determining positions of the pilots in response to the correlation set result.

In further another example, an apparatus for synchronizing pilots contained in symbols received by a receiver in a multicarrier transmission system is provided. The pilots have predetermined known values, are posited among data carriers in time and frequency dimensions including the received symbols, and have a predetermined position pattern in the time and frequency dimensions. The predetermined position pattern may include a finite number of sub-position patterns each corresponding to positions of pilots contained in one of the symbols such that at least one correlation set in the time and frequency dimensions between at least two of the symbols in response to the sub-position pattern can be determined. The apparatus include: a pilots compensator and a signal selector for determining the at least one correlation set; a correlator for generating one correlation set result for each the correlation set; and a processing unit for determining positions of the pilots in response to the correlation set result.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, the drawings are merely exemplary. It should be understood, however, that the invention is not limited to the precise arrangements and instrumentalities shown.

In the drawings:

FIG. 8 is a diagram illustrating positions of SPs for explaining another embodiment in accordance with a time-frequency correlation-based scheme;

FIG. 9 is a diagram illustrating positions of SPs for explaining an embodiment in accordance with a frequency correlation-based scheme;

DETAILED DESCRIPTION OF THE INVENTION

According to the present invention, a frequency or time-frequency correlation-based scheme that exploits frequency or time-frequency correlation characteristics of the SPs is provided for robust SP synchronization without TPS synchronization. It is to be understood that the present invention may be implemented in various forms of hardware, software, firmware, special purpose processors, or a combination thereof.

It is to be further understood that, because some of the constituent system components and method steps depicted in the accompanying figures are preferably implemented in a combination of hardware and software, the actual connections between the system components (or the process steps) may differ depending upon the manner in which the present invention is programmed. Given the teachings herein, one of ordinary skill in the related art will be able to contemplate these and similar implementations or configurations of the present invention.

Figure 1:
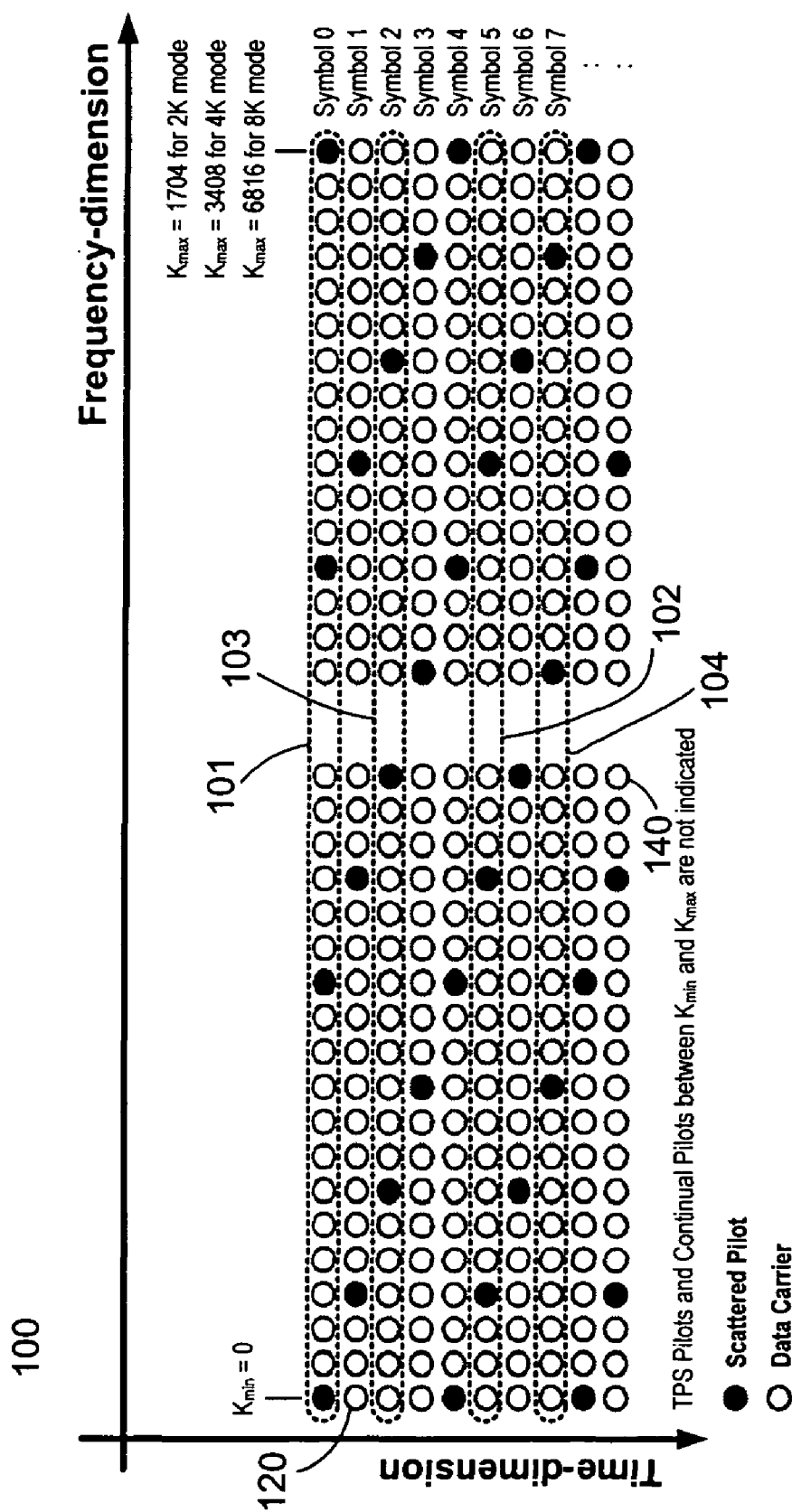
FIG. 1 is a diagram illustrating positions of SPs in DVB-T/H systems.

For ease of presenting the concept and the methods of the present invention, let us consider the SPPs identification for the DVB-T/H systems as an example. It is to be understood that the concept and the methods of the present invention can be applied to any coherent OFDM-based systems. Referring to FIG. 1, SPPs are designated by solid circles which appear as regular position pattern. The position pattern associated with the SPPs further comprises of four sub-position patterns: 101, 102, 103 and 104 in FIG. 1, wherein each sub-position pattern in the time-dimension will repeat once for every four OFDM symbols. The four sub-position patterns 101, 102, 103 and 104 are denoted as sub-position patterns 1, 2, 3, and 4, respectively. Moreover, the SPPs shift three subcarriers in view of the frequency-dimension between two adjacent OFDM symbols, and eleven data carriers are arranged between two scattered pilots in each OFDM symbol. For ease of presentation, $R_{l,k}$ is defined as the received baseband signal on the kth sub-carrier of the lth OFDM symbol. For example, the signal in the position 120 is denoted by $R_{1,0}$ and the signal in the position 140 is denoted by $R_{9,18}$.

Figure 3:
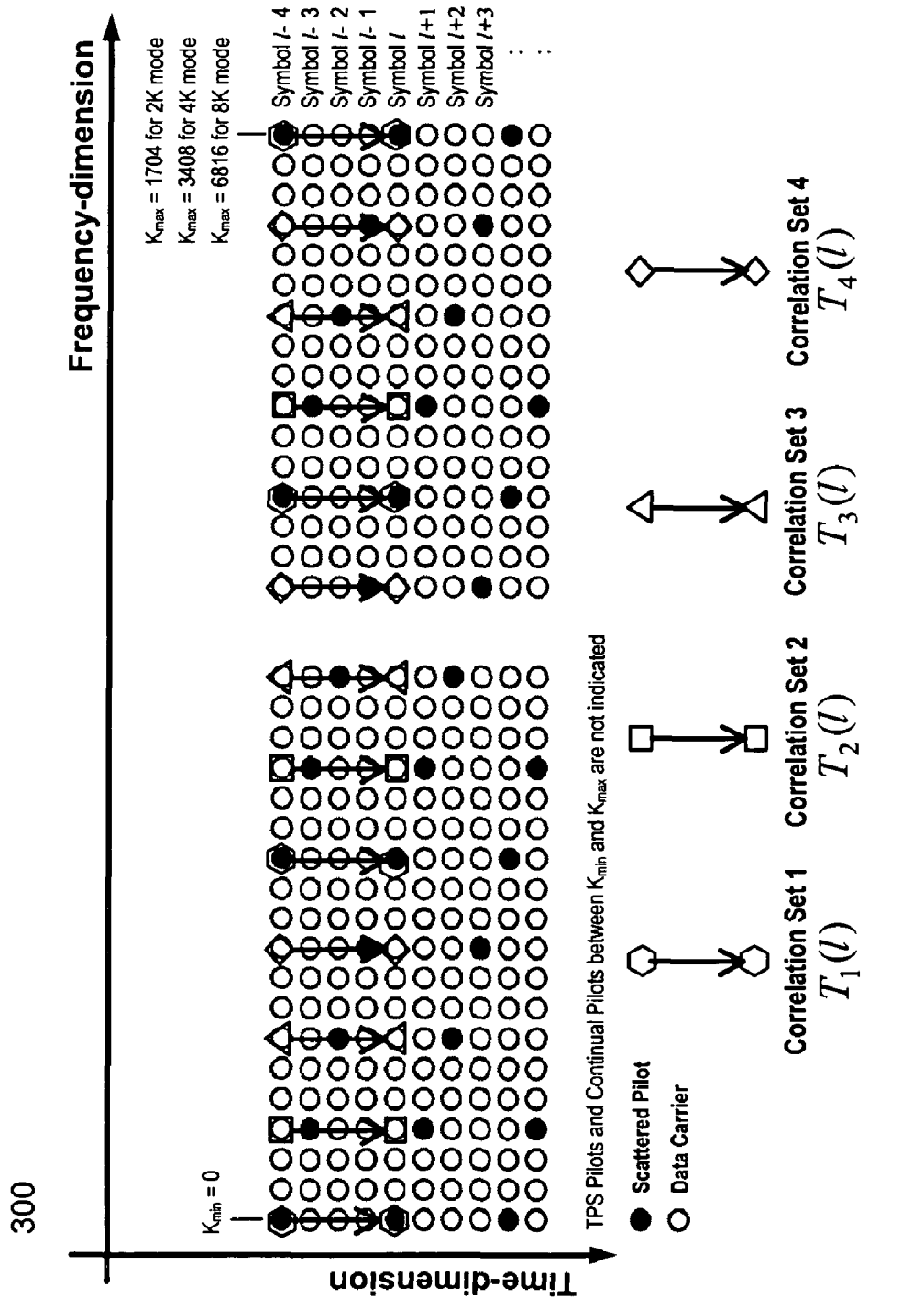
FIG. 3 is a diagram illustrating a prior art time correlation-based SPPs identification scheme.

FIG. 3 is a diagram illustrating a prior art time correlation-based SPPs identification scheme as disclosed in L. Schwoerer and J. Vesma, "Fast Scattered Pilot Synchronization for DVB-T and DVB-H," *Proc. 8$^{th}$ International OFDM Workshop*, Hamburg, Germany, Sep. 24-25, 2003. As can be observed from FIG. 3, four sets of correlation are performed for the four possible SPPs along the time-dimension and both the current and the last fourth OFDM symbols have to be accessed for each correlation set. The four correlation sets $T_i(l)$, $i \in \{1, 2, 3, 4\}$ are given as follows:

$$T_i(l) = \left| \sum_{p=0}^{p_{\max}} R_{l,12p+3(i-1)} \cdot R^*_{l-4,12p+3(i-1)} \right|$$

Theoretically, the SPs are correlated while the data symbols are uncorrelated. Thus, a correlation magnitude maximum is found for the sub-position pattern of the current SPP as $$SPP_T(l) = \arg\max_i (T_i(l)); \ i \in \{1, 2, 3, 4\}.$$

This approach exploits features of the SPs themselves instead of the TPS such that the time needed for SPPs identification is reduced to 5 $T_{OFDM}$. However, the time correlation-based SPPs identification scheme is quite sensitive to Doppler effects and sampling clock frequency offset (ScFO) effects.

Figure 4:
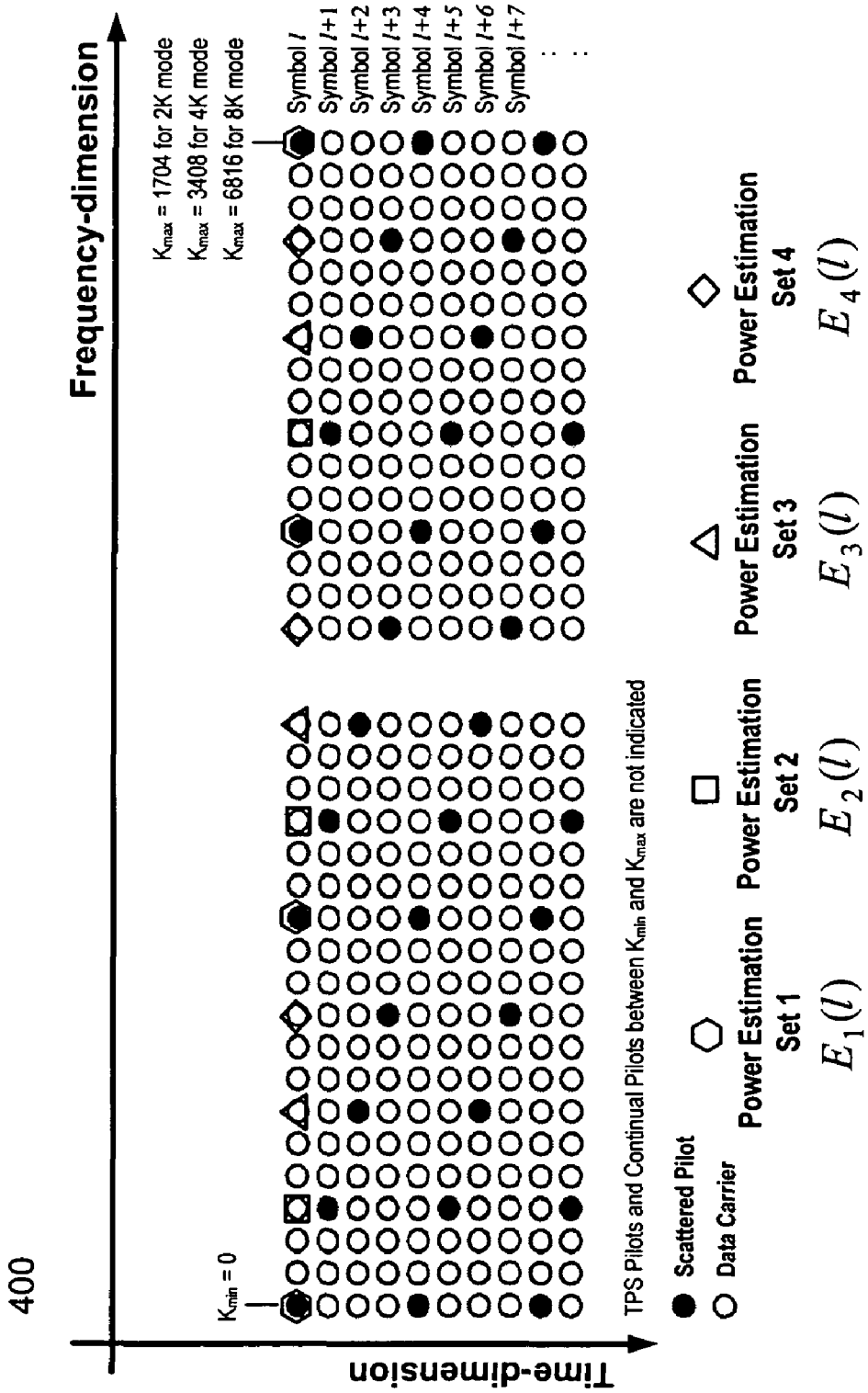
FIG. 4 is a diagram illustrating a prior art power-based SPPs identification scheme.

FIG. 4 is a diagram illustrating another prior art power-based SPPs identification scheme as disclosed in L. Schwoerer, "Fast Pilot Synchronization Schemes for DVB-H," *Proc. Wireless and Optical Communications*, Banff, Canada, Jul.

8-10, 2004, pp. 420-424. As can be observed from FIG. 4, four sets of power estimators are performed for the four possible SPPs and only the current OFDM symbol needs to be accessed for each set of power estimators. The four power estimation sets $E_i(l)$, $i \in \{1, 2, 3, 4\}$ are given as follows:

$$E_i(l) = \sum_{p=0}^{p_{max}} |R_{l,12p+3(i-1)}|^2$$

Definitely, the power of SPs is higher than the data symbols. Thus, a power maximum is found for the sub-position pattern of the current SPP as $$SPP_E(l) = \arg\max_i (E_i(l)); \, i \in \{1, 2, 3, 4\}.$$

This approach exploits features of the SPs themselves instead of the TPS such that the time needed for SPPs identification is reduced to 1 $T_{OFDM}$. However, the power-based SPPs identification scheme is quite sensitive to noise effects and ill-conditioned channel effects (e.g., echo in single-frequency networks (SFN)).

Figure 5:
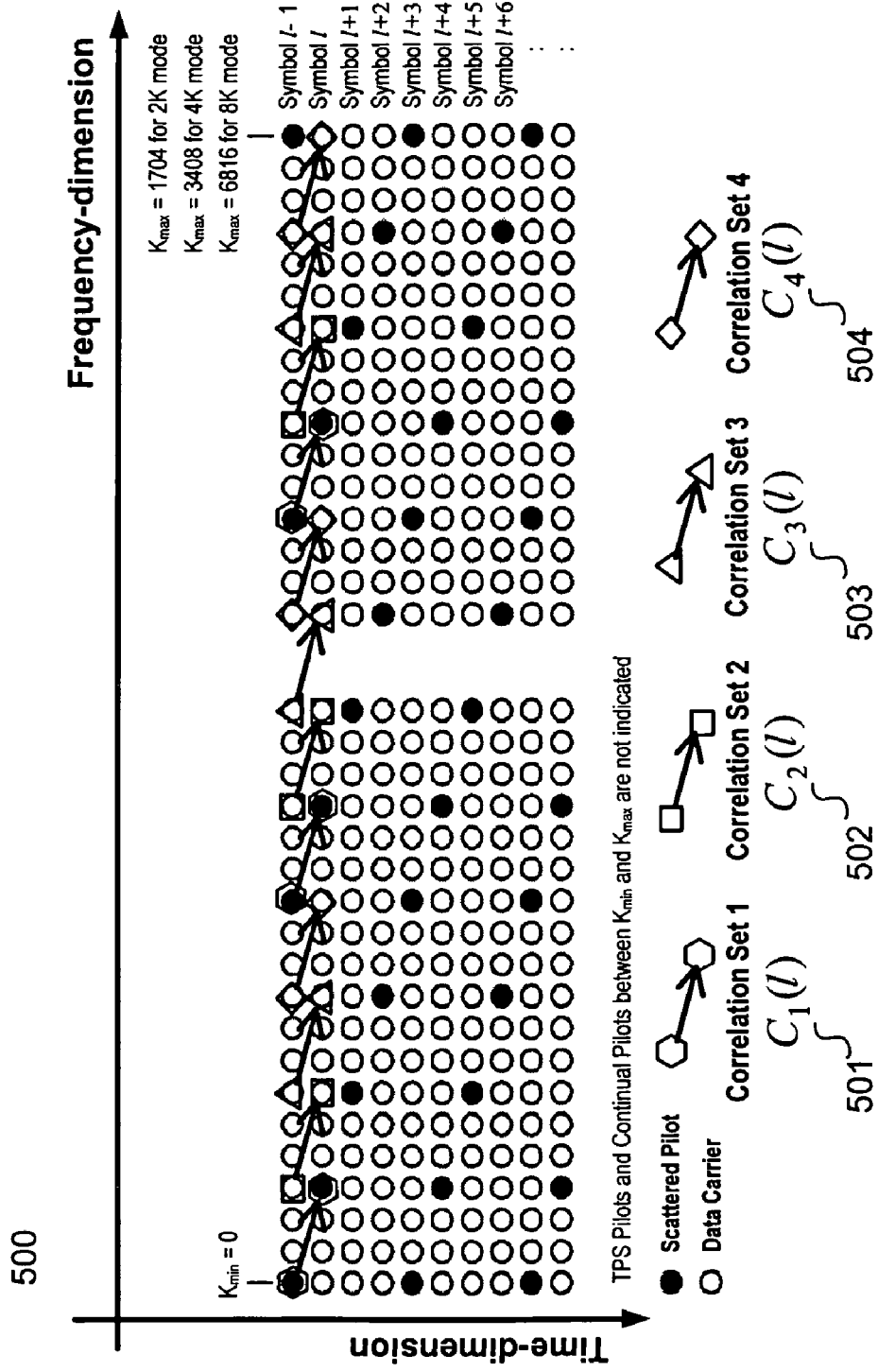
FIG. 5 is a diagram illustrating positions of SPs for explaining an embodiment in accordance with a time-frequency correlation-based scheme.

Based upon the characteristics of the SPPs above, the present invention sets forth a frequency or time-frequency correlation-based scheme for the purpose of fast and robust SPs synchronization for OFDM receivers. Referring to FIG. 5, a diagram illustrating the SPPs for explaining a time-frequency correlation-based scheme in accordance with one embodiment of the present invention is depicted schematically. As shown in FIG. 5, four correlation sets $C_1(l)$, $C_2(l)$, $C_3(l)$, $C_4(l)$ (i.e., 501, 502, 503 and 504) in view of two adjacent OFDM symbols are used for SPPs identification. The four correlation sets $C_i(l)$, $i \in \{1, 2, 3, 4\}$ are given as follows:

$$C_1(l) = \left| \sum_{p=0}^{p_{max}} (R_{l,12p+3} \cdot P_{12p+3}) \cdot (R^*_{l-1,12p} \cdot P^*_{12p}) \right|$$

$$C_2(l) = \left| \sum_{p=0}^{p_{max}} (R_{l,12p+6} \cdot P_{12p+6}) \cdot (R^*_{l-1,12p+3} \cdot P^*_{12p+3}) \right|$$

$$C_3(l) = \left| \sum_{p=0}^{p_{max}} (R_{l,12p+9} \cdot P_{12p+9}) \cdot (R^*_{l-1,12p+6} \cdot P^*_{12p+6}) \right|$$

$$C_4(l) = \left| \sum_{p=0}^{p_{max}} (R_{l,12p+12} \cdot P_{12p+12}) \cdot (R^*_{l-1,12p+9} \cdot P^*_{12p+9}) \right|$$

wherein $P_k = \pm 1$ with $k \in S_{SP} = \{0, 3, 6, 9, \ldots, K_{max}\}$ (a set of all subcarrier indices associated with all SPPs) is the (sign of the) value of the SP on kth sub-carrier defined by the DVB-T/H standard and $(p_{max}, K_{max}) = (141, 1704), (283, 3408)$ and $(567, 6816)$ for 2K, 4K and 8K modes respectively. Note that $P_k$'s required by computing the correlation $C_i(l)$ are used for SPs compensation such that $(R_{l,k} \cdot P_k)$ and $(R_{l-1,k-3} \cdot P_{k-3})$ could be positively correlated if $R_{l,k}$ carries an SP. Then, a clear distinct correlation magnitude maximum should be found for the sub-position pattern of the current SPP as $$SPP(l) = \left(1 + \arg\max_i (C_i(l))\right) \mod 4; \, i \in \{1, 2, 3, 4\}.$$

As an example, if Symbol 0 and Symbol 1 shown in FIG. 1 are used to generate four correlations $C_1(1)$, $C_2(1)$, $C_3(1)$, $C_4(1)$, wherein Symbol 1 is the current OFDM symbol, i.e., $l=1$. The correlation $C_1(1)$ is then greater than the other three correlations $C_2(1)$, $C_3(1)$, $C_4(1)$, and thus the current SPP corresponds to sub-position pattern index SPP(1)=2 (i.e., sub-position pattern 2). Moreover, if Symbol 1 and Symbol 2 shown in FIG. 1 are utilized to generate four correlations $C_1(2)$, $C_2(2)$, $C_3(2)$, $C_4(2)$, wherein Symbol 2 is the current OFDM symbol, i.e., $l=2$. The correlation $C_2(2)$ is then greater than the other three correlations $C_1(2)$, $C_3(2)$, $C_4(2)$, and thus the current SPP corresponds to sub-position pattern index SPP(2)=3 (i.e., sub-position pattern 3). Furthermore, if Symbol 2 and Symbol 3 shown in FIG. 1 are utilized to generate four correlations $C_1(3)$, $C_2(3)$, $C_3(3)$, $C_4(3)$, wherein Symbol 3 is the current OFDM symbol, i.e., $l=3$. The correlation $C_3(3)$ is then greater than the other three correlations $C_1(3)$, $C_2(3)$, $C_4(3)$, and thus the current SPP corresponds to sub-position pattern index SPP(3)=4 (i.e., sub-position pattern 4). In addition, if Symbol 3 and Symbol 4 shown in FIG. 1 are utilized to generate four correlations $C_1(4)$, $C_2(4)$, $C_3(4)$, $C_4(4)$, wherein Symbol 4 is the current OFDM symbol, i.e., $l=4$. The correlation $C_4(4)$ is then greater than the other three correlations $C_1(4)$, $C_2(4)$, $C_3(4)$, and thus the current SPP corresponds to a sub-position pattern index SPP(4)=1 (i.e., sub-position pattern 1).

It is to be noted that, instead of accumulating all available $(p_{max}+1)$ complex values of $(R_{l,12p+3i} \cdot P_{12p+3i}) \cdot (R^*_{l-1,12p+3(i-1)} \cdot P_{12p+3(i-1)})$ for $C_i(l)$, $i \in \{1, 2, 3, 4\}$, accumulation of only partial set of complex values of $(R_{l,12p+3i} \cdot P_{12p+3i}) \cdot (R^*_{l,12p+3(i-1)} \cdot P^*_{12p+3(i-1)})$ may suffice for robust SPPs identification. Therefore, the four correlation sets $C_i(l)$, $i \in \{1, 2, 3, 4\}$ can be generalized as $$C_i(l) = \left| \sum_{p \in Z} (R_{l,12p+3i} \cdot P_{12p+3i}) \cdot (R^*_{l-1,12p+3(i-1)} \cdot P^*_{12p+3(i-1)}) \right|$$

wherein $Z \subset \{0, 1, 2, \ldots, p_{max}\}$.

Figure 6:
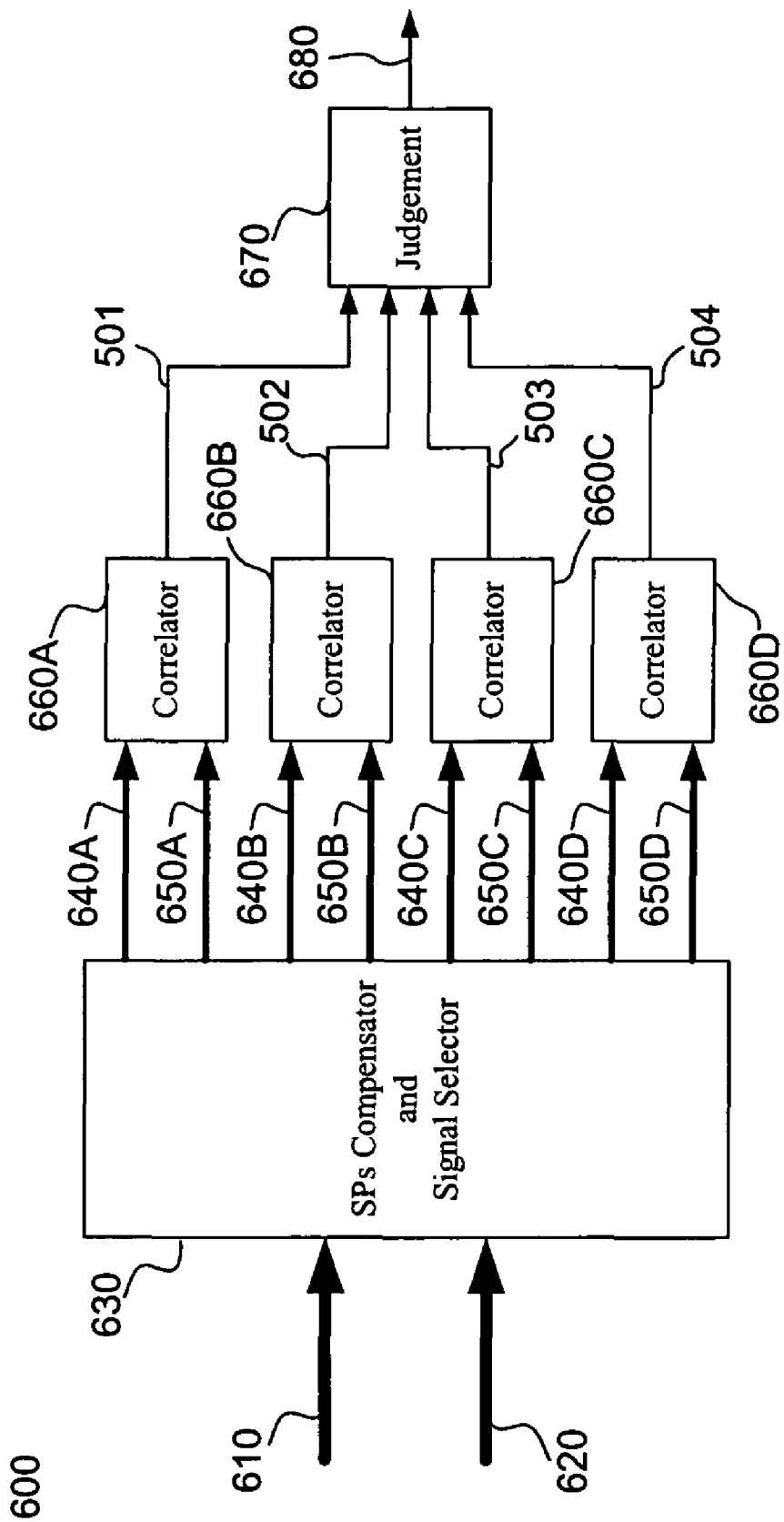
FIG. 6 is a block diagram of one example to implement the embodiment of FIG. 5.

Referring to FIG. 6, a block diagram of one example to implement the time-frequency correlation-based scheme of the present invention as depicted in FIG. 5 is provided. As shown in FIG. 6, the time-frequency correlation-based scheme of the present invention basically comprises an SP compensator and signal selector 630, four correlators 660A, 660B, 660C and 660D, and a judgment or processing block 670. Signals 610 and 620 applied to the SP compensator and signal selector 630 are the received baseband signal $R_{l,k}$ from an OFDM receiver and known $P_k$ wherein $k \in S_{SP} = \{0, 3, 6, 9, \ldots, K_{max}\}$. The SP compensator and signal selector 630 is employed to obtain sub-signals 640A, 640B, 640C, 640D, 650A, 650B, 650C, and 650D, which are associated to $(R_{l,12p+3} \cdot P_{12p+3})$, $(R_{l,12p+6} \cdot P_{12p+6})$, $(R_{l,12p+9} \cdot P_{12p+9})$, $(R_{l,12p+12} \cdot P_{12p+12})$, $(R_{l-1,12p} \cdot P_{12p})$, $(R_{l-1,12p+3} \cdot P_{12p+3})$, $(R_{l-1,12p+6} \cdot P_{12p+6})$ and $(R_{l-1,12p+9} \cdot P_{12p+9})$, respectively, wherein $p \in Z \subset \{0, 1, 2, \ldots, p_{max}\}$. Preferably, the SP compensator and signal selector 630 includes a buffer to receive the signals 610 for storing the signals of the previous OFDM symbol l−1. Sub-signals 640A and 650A are applied to the correlator 660A, sub-signals 640B and 650B are applied to the correlator 660B, sub-signals 640C and 650C are applied to the correlator 660C, and sub-signals 640D and 650D are applied to the correlator 660D. The correlators 660A, 660B, 660C and 660D are employed to compute four correlation set results 501, 502, 503 and 504, which are associated to the correlation sets $C_1(l)$, $C_2(l)$, $C_3(l)$ and $C_4(l)$ as depicted in FIG. 5, respectively. Preferably, the correlator 660A includes a complex conjugate function to generate the conjugate part of a signal, a complex multiplier and an accumulator, while correlators 660B, 660C and 660D can be implemented the same. Subsequently, the four correlation set results 501, 502, 503 and 504 are all supplied to a judgment or processing block 670 to determine the maximum thereof and generate a judgment or processing result 680 as SPP(l) indicating the sub-position pattern exhibited by the SPs in the current lth OFDM symbol accordingly. Preferably, the judgment or processing unit 680 includes a peak detector or a comparator so as to determine the maximum of correlation set results 501, 502, 503 and 504. It is to be understood that, because some of the sub-signals 640A, 640B, 640C, 640D, 650A, 650B, 650C, and 650D appear in different time, one of ordinary skill in the related art such as time-sharing based hardware design will be able to obtain the four correlation set results 501, 502, 503 and 504 with only one correlator 660A.

It is to be noted that, in virtue of the fact that $(R_{l,k} \cdot P_k)$ and $(R_{l-1,k3} \cdot P_{k-3})$ could be positively correlated if $R_{l,k}$ carries an SP, the four correlation sets $C_i(l)$, $i \in \{1, 2, 3, 4\}$ can be further simplified as $$C_i(l) = \left| \sum_{p \in Z} \text{Re}\{(R_{l,12p+3i} \cdot P_{12p+3i}) \cdot (R^*_{l-1,12p+3(i-1)} \cdot P^*_{12p+3(i-1)})\} \right|$$

wherein $Z \subset \{0, 1, 2, \ldots, p_{max}\}$. Therefore, instead of obtaining the result of $(R_{l,12p+3i} \cdot P_{12p+3i}) \cdot (R_{l-1,12p+3(i-1)} \cdot P_{12p+3(i-1)})$ by a complex multiplier, only two real multipliers and one adder suffice for computing $$\text{Re}\{(R_{l,12p+3i} \cdot P_{12p+3i}) \cdot (R^*_{l-1,12p+3(i-1)} \cdot P^*_{12p+3(i-1)})\} =$$
$$\text{Re}\{R_{l,12p+3i} \cdot P_{12p+3i}\} \cdot \text{Re}\{R_{l-1,12p+3(i-1)} \cdot P_{12p+3(i-1)}\} +$$
$$\text{Im}\{R_{l,12p+3i} \cdot P_{12p+3i}\} \cdot \text{Im}\{R_{l-1,12p+3(i-1)} \cdot P_{12p+3(i-1)}\}$$

for $C_i(l)$, $i \in \{1, 2, 3, 4\}$.

As compared with the conventional time correlation-based scheme of the required synchronization time $5T_{OFDM}$, the time-frequency correlation-based scheme of this example may require only two adjacent OFDM symbols in order to compute the correlation set results $C_1(l)$, $C_2(l)$, $C_3(l)$, $C_4(l)$ and then determine the maximum thereof to be associated with the judgment or processing result 680 indicating the correct SPPs of the current symbol. The time-frequency correlation-based scheme of this example hence benefits not only the ability of fast synchronization speed but also the robustness against Doppler effects due to less stringent requirement on the channel coherence time. In addition, the time-frequency correlation-based scheme of this example may be less sensitive to ScFO effects than the conventional time correlation-based scheme. On the other hand, as compared with the conventional power-based scheme requiring a synchronization time of $T_{OFDM}$, the time-frequency correlation-based scheme of this example may provide robustness against noise effects due to the correlation gain at the cost of slightly longer synchronization time $2T_{OFDM}$. Furthermore, another advantage of the example over both time correlation-based and power-based schemes is that the time-frequency correlation-based scheme is free from the correlation-interference caused by CP defined in DVB-T/H wherein the CP are continuously located at the same subset $S_{CP}$ of subcarriers over all OFDM symbols with $S_{CP} \subset S_{SP}$.

Figure 7A:
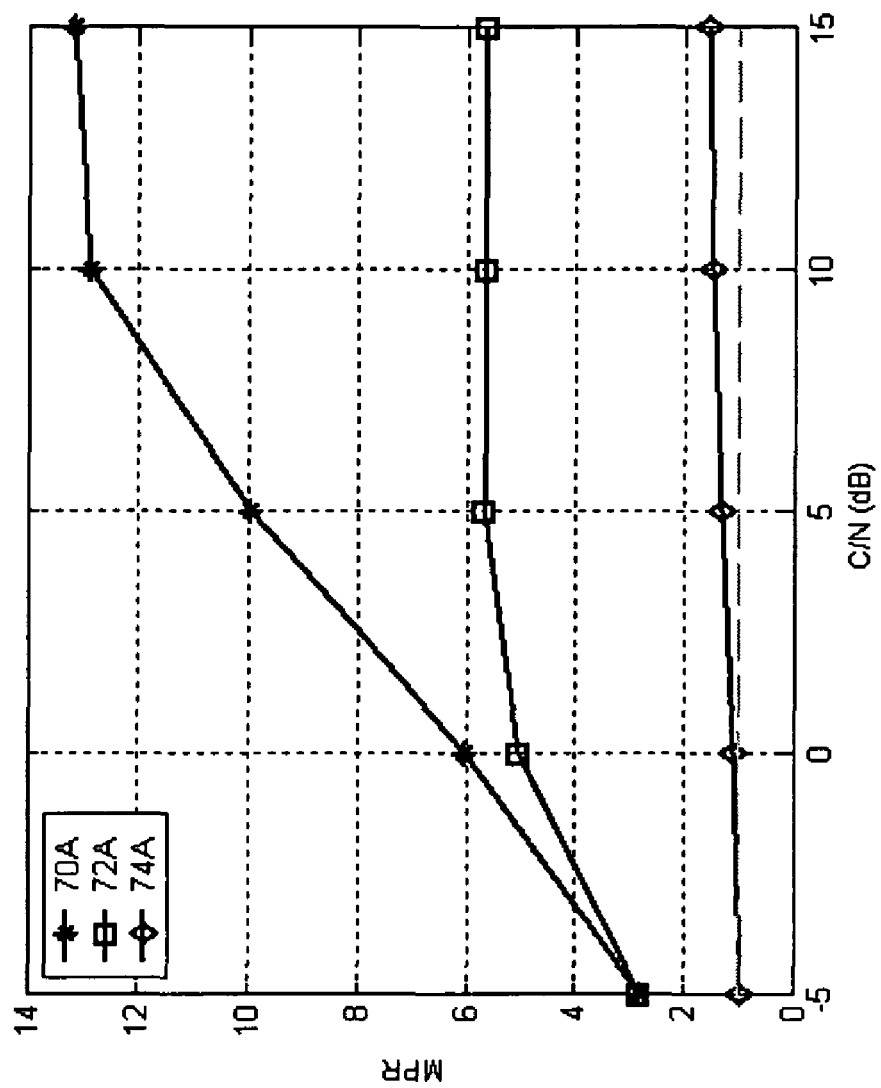
FIGS. 7A and 7B are diagrams illustrating the minimum protection ratio (MPR) associated with the time-frequency correlation-based scheme of the present invention, the conventional time correlation-based and power-based schemes upon simulation results.
Figure 7B:
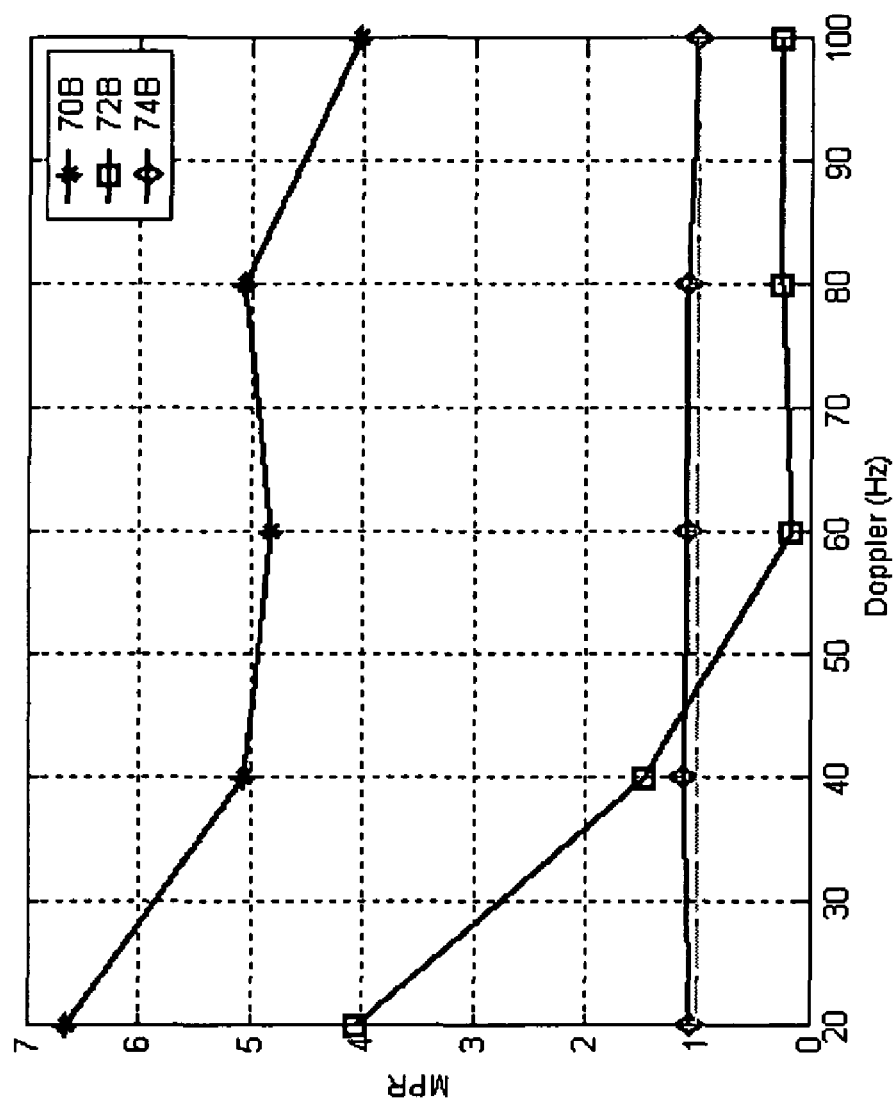

Some of the simulation results (for 8 k mode in DVB-T/H with a guard interval of ¼ useful symbol length) are shown in FIGS. 7A and 7B for supporting the efficacy and robustness of the time-frequency correlation-based scheme in one example. FIGS. 7A and 7B plot the minimum protection ratio (MPR), a performance index used by L. Schwoerer, "Fast Pilot Synchronization Schemes for DVB-H," *Proc. Wireless and Optical Communications*, Banff, Canada, Jul. 8-10, 2004, pp. 420-424. In particular, FIGS. 7A and 7B are the MPR plot of an example of the time-frequency correlation-based scheme and of the conventional time correlation-based and power-based schemes over 1000 independent runs for static AWGN channel model with various carrier-to-noise ratio (C/N) and typical urban channel model with various Doppler frequencies (with C/N=5 dB), respectively. The MPR for the time-frequency correlation-based scheme of this example is defined as $$MPR = \min_n (PR(n)); n \in \{1, 2, \ldots, 1000\}$$

wherein PR(n) is the protection ratio associated with the nth independent run and is defined as $$PR(n) = \min_i \left( \frac{C^{(n)}_{i_{true}}(l)}{C^{(n)}_i(l)} \right); i \in \{1, 2, 3, 4\} \text{ and } i \neq i_{true}$$

in which $i_{true} \in \{1, 2, 3, 4\}$ is the sub-position pattern index corresponding to the true SPPs associated with the lth OFDM symbol. The MPRs for the conventional time correlation-based and power-based schemes are defined in a similar way with $C_i^{(n)}(l)$ replaced by $T_i^{(n)}(l)$ and $E_i^{(n)}(l)$, respectively. It is noted that the higher the MPR value the more robust the performance of the SPPs identification scheme, wherein MPR<1 implies at least one erroneous detection of the SPPs exists over the 1000 independent runs.

In FIGS. 7A and 7B, curves 70A and 70B are associated with the time-frequency correlation-based scheme of one example, wherein curves 72A and 72B correspond to the conventional time correlation-based scheme and curves 74A and 74b correspond to the conventional power-based scheme.

As shown in FIG. 7A, both the time-frequency correlation-based scheme of one example and the conventional time correlation-based scheme are uniformly more robust against noise effects than the conventional power-based scheme due to the correlation gain. The time-frequency correlation-based scheme in some examples may outperform the conventional time correlation-based scheme under higher C/N because the latter may suffer from the correlation-interference due to CP that dominates the performance for low noise condition. As shown in FIG. 7B, the conventional power-based scheme is as expected insensitive to Doppler effects and the time-frequency correlation-based scheme may be more robust against Doppler effects than the conventional time correlation-based scheme whose performance is significantly degraded for Doppler frequency larger than 60 Hz because the latter requires longer coherence time. In summary, the time-frequency correlation-based scheme may outperform the conventional time correlation-based and power-based schemes in view of robustness against both Doppler and noise effects.

The time-frequency correlation-based scheme can further provide a flexible design for the trade-off between hardware cost and synchronization time in some examples. Referring to FIG. 8, a diagram illustrating the SPPs for explaining another embodiment in accordance with the time-frequency correlation-based scheme. As compared with the embodiment of FIG. 5, this embodiment makes use of only one correlation set, for example, $C_1(l)$, to determine the correct SPP of the current symbol. If the time-frequency correlation-based scheme of FIG. 8 is implemented in the same manner as FIG. 6, three sets of correlators 660B, 660C and 660D can be omitted with certain modification on the SPPs identification scheme. One possible modification involved is that the judgment or processing block 670 should include a detector provided with threshold detection approach so that the current SPPs are identified as sub-position pattern 2 if $C_1(l)$ is larger than a threshold value. Another possible modification is that the correlator 660A should be performed four times to obtain $C_1(l)$, $C_1(l-1)$, $C_1(l-2)$ and $C_1(l-3)$ using the $(l,l-1)$, $(l-1,l-2)$, $(l-2,l-3)$ and $(l-3,l-4)$ OFDM symbols pairs, respectively. Then, a clear distinct correlation magnitude maximum among $C_1(l)$, $C_1(l-1)$, $C_1(l-2)$ and $C_1(l-3)$ should be found by the judgment or processing block 670. Denoting $$l_{max} = \arg \max_m (C_1(m)); m \in \{l, l-1, l-2, l-3\},$$

the SPPs of the $l_{max}$th OFDM symbol are thus identified as sub-position pattern 2. For the same reason, any combination of two or three of the correlation-sets $C_1(l)$, $C_2(l)$, $C_3(l)$ and $C_4(l)$ can be used in a similar way as a direct extension of the second embodiment shown in FIG. 8 to reduce the number of the required correlators in exchange of the increased synchronization time $2\sim5T_{OFDM}$.

Referring to FIG. 9, in another example, a frequency correlation-based scheme may be implemented. The implementation may be based on the characteristics of the SPPs noted above and, in some examples, may be used for providing fast and robust SPs synchronization for OFDM receivers. The implementation may be used to increase the processing speed of an OFDM receiver and improve SP synchronization. Referring to FIG. 9, in an example of having one OFDM symbol, one correlation set, such as $F_1(l)$, $F_2(l)$, $F_3(l)$ and $F_4(l)$ illustrated as in FIG. 9, may be used to determine the correct SPP of the current symbol. For example, the correlation set $F_i(l)$, $i \in \{1, 2, 3, 4\}$ may be given as:

$$F_1(l) = \left| \sum_{p=0}^{p_{max}} (R_{l,12p} \cdot P_{12p}) \cdot (R^*_{l,12(p+1)} \cdot P^*_{12(p+1)}) \right|$$

$$F_2(l) = \left| \sum_{p=0}^{p_{max}} (R_{l,12p+3} \cdot P_{12p+3}) \cdot (R^*_{l,12(p+1)+3} \cdot P^*_{12(p+1)+3}) \right|$$

$$F_3(l) = \left| \sum_{p=0}^{p_{max}} (R_{l,12p+6} \cdot P_{12p+6}) \cdot (R^*_{l,12(p+1)+6} \cdot P^*_{12(p+1)+6}) \right|$$

$$F_4(l) = \left| \sum_{p=0}^{p_{max}} (R_{l,12p+9} \cdot P_{12p+9}) \cdot (R^*_{l,12(p+1)+9} \cdot P^*_{12(p+1)+9}) \right|$$

In one example, the $P_k$'s required for computing the correlation may be used for SP compensation such that $(R_{l,k} \cdot P_k)$ and $(R_{l,k+12} \cdot P_{k+12})$ could be positively correlated if $R_{l,k}$ carries an SP. Then, a distinct correlation magnitude maximum may be found, which may correspond to the sub-position pattern of the current SPP as $$SPP(l) = \arg \max_i (F_i(l)); i \in \{1, 2, 3, 4\}.$$

As an example, if Symbol 0 shown in FIG. 1 is used to generate four correlations $F_1(0)$, $F_2(0)$, $F_3(0)$, $F_4(0)$, wherein Symbol 0 is the current OFDM symbol, i.e., $l=0$. The correlation $F_1(0)$ would be greater than the other three correlations $F_2(0)$, $F_3(0)$, $F_4(0)$. Therefore, the sub-position pattern of the current SPP is SPP(0)=1 (sub-position pattern 1). Moreover, if Symbol 1 shown in FIG. 1 is used to generate four correlations $F_1(1)$, $F_2(1)$, $F_3(1)$, $F_4(1)$, wherein Symbol 1 is the current OFDM symbol, i.e., $l=1$. The correlation $F_2(1)$ would be then greater than the other three correlations $F_1(1)$, $F_3(1)$, $F_4(1)$, and therefore corresponds to sub-position pattern of the current SPP SPP(1)=2 (sub-position pattern 2). Furthermore, if Symbol 2 shown in FIG. 1 is used to generate four correlations $F_1(2)$, $F_2(2)$, $F_3(2)$, $F_4(2)$, wherein Symbol 2 is the current OFDM symbol, i.e., $l=2$. The correlation $F_3(2)$ would be greater than the other three correlations $F_1(2)$, $F_2(2)$, $F_4(2)$, and therefore corresponds to sub-position pattern of the current SPP SPP(2)=3 (sub-position pattern 3). Similarly, if Symbol 3 shown in FIG. 1 is used to generate four correlations $F_1(3)$, $F_2(3)$, $F_3(3)$, $F_4(3)$, wherein Symbol 3 is the current OFDM symbol, i.e., $l=3$. The correlation $F_4(3)$ would be greater than the other three correlations $F_1(3)$, $F_2(3)$, $F_3(3)$), and therefore corresponds to sub-position pattern of the current SPP SPP(3)=4 (sub-position pattern 4).

It is to be noted that, instead of accumulating all available $(P_{max+1})$ complex values of $(R_{l,12p} \cdot P_{12p}) \cdot (R^*_{l,12(p+1)+3(i-1)} \cdot P^*_{12(p+1)+3(i-1)})$ for $F_i(l)$, $i \in \{1, 2, 3, 4\}$, accumulation of only partial set of complex values of $(R_{l,12p} \cdot P_{12p}) \cdot (R^*_{l,12(p+1)+3(i-1)} \cdot P^*_{12(p+1)+3(i-1)})$ may suffice for providing robust SPPs identification. Therefore, the four correlation sets $F_i(l)$, $i \in \{1, 2, 3, 4\}$ can be generalized as $$F_i(l) = \left| \sum_{p \in Z} (R_{l,12p} \cdot P_{12p}) \cdot (R^*_{l,12(p+1)+3(i-1)} \cdot P^*_{12(p+1)+3(i-1)}) \right|,$$

wherein $Z \subset \{0, 1, 2, \ldots, p_{max}\}$.

Figure 10:
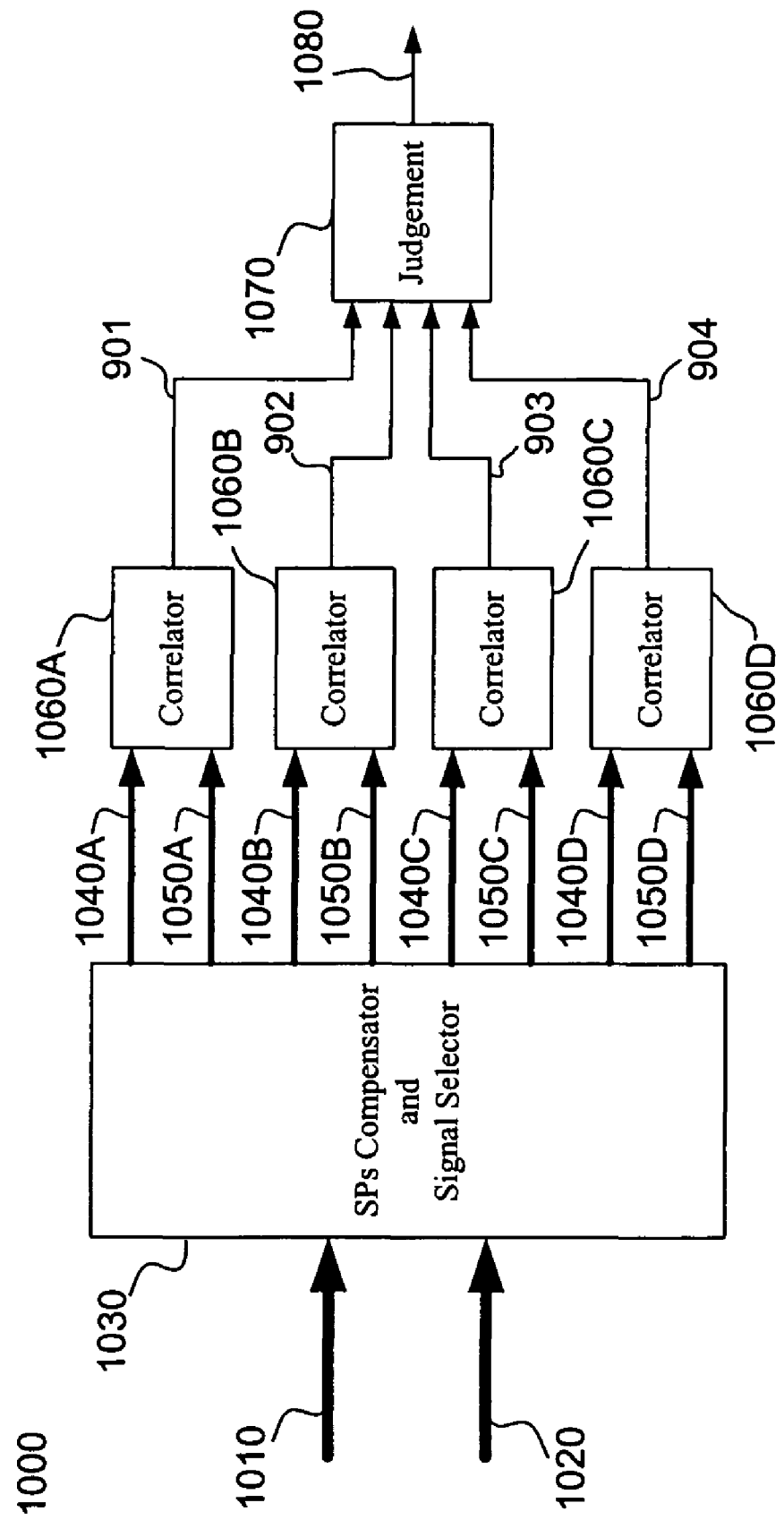
FIG. 10 is a block diagram of one example to implement the embodiment of FIG. 9.

The block diagram of FIG. 6 may be applicable to the exemplary implementation described in FIG. 9 and above paragraphs. FIG. 10 illustrates an exemplary block diagram for implementing a frequency correlation-based scheme. Referring to FIG. 10, the frequency correlation-based scheme may include an SP compensator and signal selector 1030, four correlators 1060A, 1060B, 1060C and 1060D, and a judgment or processing block 1070. Signals 1010 and 1020 applied to the SP compensator and signal selector 1030 are the received baseband signal $R_{l,k}$ from an OFDM receiver with known $P_k$ wherein $k \in S_{SP} = \{0, 3, 6, 9, \ldots, K_{max}\}$. The SP compensator and signal selector 1030 may be employed to obtain sub-signals 1040A, 1040B, 1040C, 1040D, and 1050D, which are associated to $(R_{l,12p} \cdot P_{12p})$, $(R_{l,12p+3} \cdot P_{12p+3})$, $(R_{l,12p+6} \cdot P_{12p+6})$, $(R_{l,12p+9} \cdot P_{12p+9})$, $(R_{l,12(p+1)} \cdot P_{12(p+1)})$, $(R_{l,12(p+1)+3} \cdot P_{12(p+1)+3})$, $(R_{l,12(p+1)+6} \cdot P_{12(p+1)+6})$, and $(R_{l,12(p+1)+9} \cdot P_{12(p+1)+9})$, wherein $p \in Z \subset \{0, 1, 2, \ldots, p_{max}\}$. In one example, sub-signal 1040A and 1050A may be applied to correlator 1060A; sub-signal 1040B and 1050B may be applied to correlator 1060B; sub-signal 1040C and 1050C may be applied to correlator 1060C; sub-signal 1040D and 1050D may be applied to correlator 1060D.

Correlators 1060A, 1060B, 1060C and 1060D may be used to compute four correlation set results 901, 902, 903 and 904, which are respectively correlated to correlation sets $F_1(l)$, $F_2(l)$, $F_3(l)$ and $F_4(l)$ illustrated in FIG. 9. In one example, correlator 660A may include a complex conjugate function to generate the conjugate part of a signal, a complex multiplier, and an accumulator, and correlators 660B, 660C and 660D may be implemented in the same or similar manner. Subsequently, four correlation set results 901, 902, 903 and 904 may be submitted to judgment or processing block 1070 to determine the maximum among them and generate a judgment or processing result 1080 as SPP(l), which may indicate the sub-position pattern of the SP for the current lth OFDM symbol accordingly.

In one example, the judgment or processing unit 1080 may include a peak detector or a comparator so as to determine the maximum of correlation set results 901, 902, 903 and 904. It is noted that some of the sub-signals 1040A, 1040B, 1040C, 1040D, 1050A, 1050B, 1050C, and 1050D may appear at different times. Accordingly, one of ordinary skill in the related art, such as in the field of time-sharing or resource-sharing hardware design, may be able obtain the four correlation set results 901, 902, 903 and 904 with a less number of correlators, such as with only one correlator 1060A.

It is to be noted that, due to the fact that $(R_{l,k} \cdot P_k)$ and $(R_{l,k+12} \cdot P_{k+12})$ could be positively correlated if $R_{l,k}$ carries an SP, the four correlation sets $F_i(l)$, $i \in \{1, 2, 3, 4\}$ can be simplified as $$F_i(l) = \left| \sum_{p \in Z} \mathrm{Re}\{(R_{l,12p} \cdot P_{12p}) \cdot (R^*_{l,12(p+1)+3(i-1)} \cdot P^*_{12(p+1)+3(i-1)})\} \right|$$

wherein $Z \subset \{0, 1, 2, \ldots, p_{max}\}$. Therefore, instead of obtaining the result of $(R_{l,12p} \cdot P_{12p})$, $(R^*_{l,12(p+1)+3(i-1)} \cdot P^*_{12(p+1)+3(i-1)})$ by a complex multiplier, only two real-number multipliers and one adder are sufficient for computing $$\mathrm{Re}\{(R_{l,12p} \cdot P_{12p}) \cdot (R^*_{l,12(p+1)+3(i-1)} \cdot P^*_{12(p+1)+3(i-1)})\} =$$

$$\mathrm{Re}\{R_{l,12p} \cdot P_{12p}\} \cdot \mathrm{Re}\{R_{l,12(p+1)+3(i-1)} \cdot P_{12(p+1)+3(i-1)}\} +$$

$$\mathrm{Im}\{R_{l,12p} \cdot P_{12p}\} \cdot \mathrm{Im}\{R_{l,12(p+1)+3(i-1)} \cdot P_{12(p+1)+3(i-1)}\}$$

for $F_i(l)$, $i \in \{1, 2, 3, 4\}$.

As compared with the conventional time correlation-based scheme of the required synchronization time $5T_{OFDM}$, the frequency correlation-based scheme in these examples requires only one OFDM symbol in order to compute the correlation set results $F_1(l)$, $F_2(l)$, $F_3(l)$, $F_4(l)$ and determine the maximum of the results. The judgment or processing result 1080 may identify the correct SPPs of the current symbol. Accordingly, a frequency correlation-based scheme may improve the ability of fast synchronization speed and/or improve the robustness against Doppler effects due to a less stringent requirement on the channel coherence time. In addition, a frequency correlation-based scheme may be less sensitive to ScFO effects when compared with conventional time correlation-based schemes. In some examples, when compared with the conventional power-based scheme of the required synchronization time $T_{OFDM}$, the frequency correlation-based scheme may provide robustness against noise effects due to the correlation gain at the cost of slightly longer synchronization time $2T_{OFDM}$. Furthermore, a frequency correlation-based scheme may be free from the correlation-interference caused by CP defined in DVB-T/H.

Figure 11:
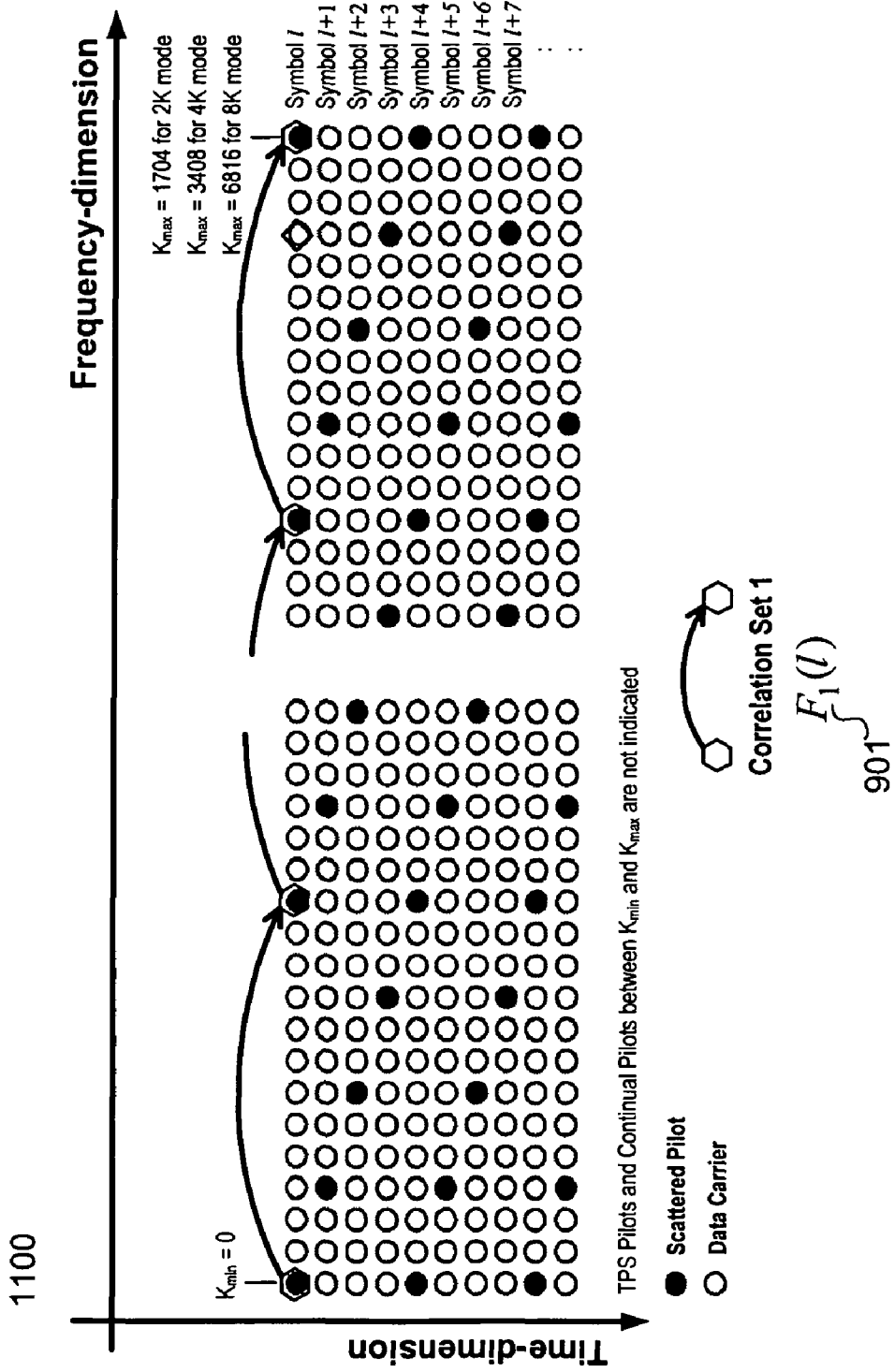
FIG. 11 is a diagram illustrating positions of SPs for explaining another embodiment in accordance with a frequency correlation-based scheme.

The frequency correlation-based scheme noted in the examples above may provide a flexible design taking into consideration of both hardware cost and synchronization time. FIG. 11 illustrates another example of implementing a frequency correlation-based scheme. Referring to FIG. 11, this example uses only one correlation, such as $F_1(l)$ to determine the correct SPP of a current symbol. When the design illustrated in FIG. 10 is used for such implementation, the SPP identification components may be modified to remove three correlators 1060B, 1060C, and 1060D. One example is to have judgment or processing block 1070 include a threshold value detecting device, such that when $F_1(l)$ is larger than a certain threshold, the current SPP may be identified as sub-position pattern 1. Another example is to execute correlator 660A for four times in order to use the lth, l-1th, l-2th, and l-3th OFDM symbols to respectively obtain $F_1(l)$, $F_1(l-1)$, $F_1(l-2)$, and $F_1(l-3)$. Thereafter, judgment or processing block 1070 may uncover a distinct maximum of correlation magnitude, which may be labeled as $$l_{max} = \arg \max_m (F_1(m)); m \in \{l, l-1, l-2, l-3\},$$

and the SPP of the $l_{max}$th OFDM symbol are thus identified as sub-position pattern 1. Applying the technique noted here, any combination of two or three of the correlation sets $F_1(l)$, $F_2(l)$, $F_3(l)$ and $F_4(l)$ can be used in a similar way as a variation of the examples in FIG. 11 to reduce the number of correlators required with increased synchronization time of 1~4 $T_{OFDM}$.

Figure 2:
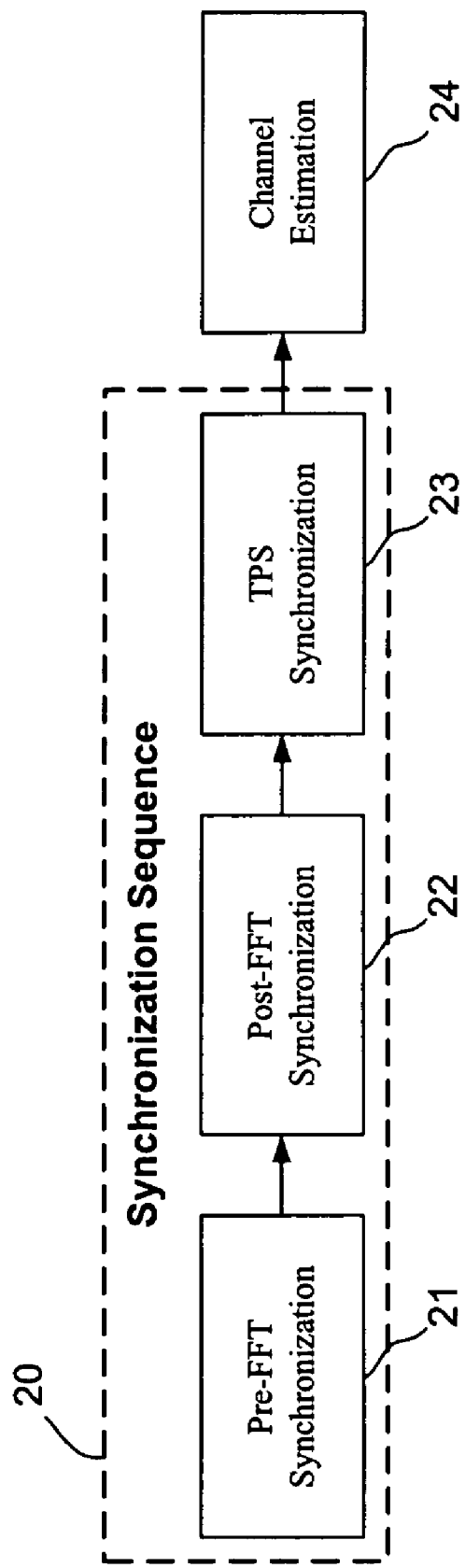
FIG. 2 is a diagram illustrating a typical DVB-T/H synchronization sequence (or synchronization procedure)
Figure 12:
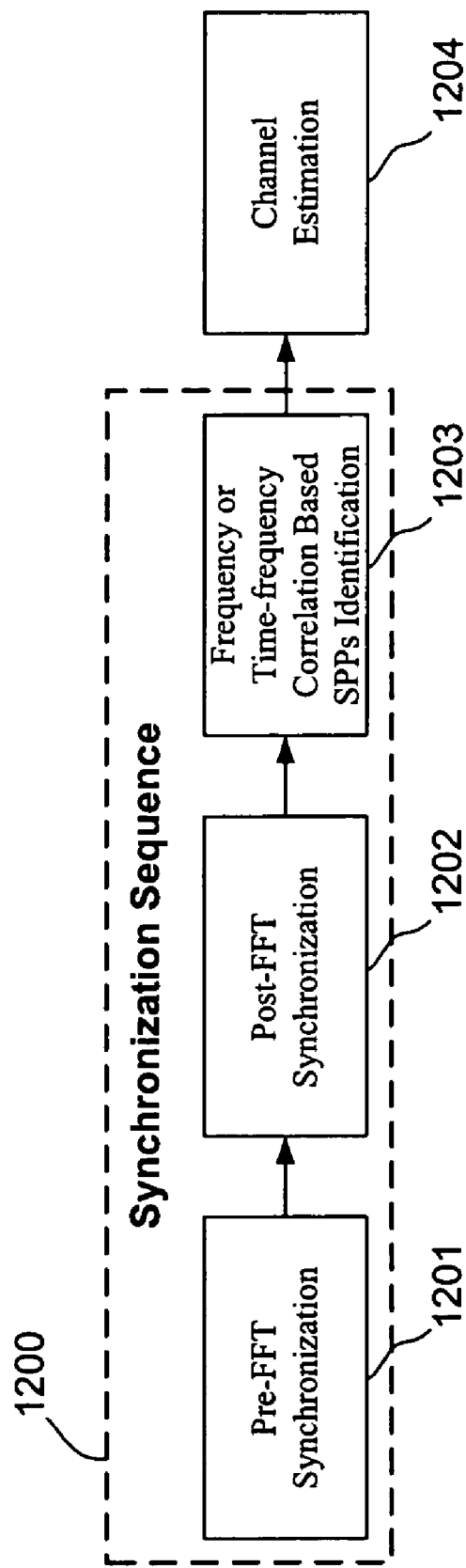
FIG. 12 is a diagram illustrating an application of the present invention in the synchronization procedure of DVB-T/H receivers.

FIG. 12 is a diagram illustrating an application of the present invention in the synchronization procedure of DVB-T/H receivers. Compared to the typical DVB-T/H synchronization sequence shown in FIG. 2, SPPs required by channel estimation are identified through the present invention without TPS synchronization.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

Further, in describing representative embodiments, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible.

Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:

1. A method for synchronizing pilots contained in symbols received by a receiver in a multicarrier transmission system, the pilots having predetermined known values, being posited among data carriers in a frequency dimension containing the received symbols and having a predetermined position pattern in the frequency dimension, wherein the predetermined position pattern comprising a finite number of sub-position patterns each corresponding to positions of pilots contained in one of the symbols, the method comprising:

determining at least one correlation set in the frequency dimension between two sub-carriers of at least one symbol at different frequencies;

generating a correlation set result in response to each the correlation set; and determining positions of the pilots in the frequency dimension and time dimension in response to the correlation set results, wherein the pilots are posited among data carriers in the frequency dimension and a time dimension comprising of the received symbols and have a predetermined position pattern in the frequency and time dimensions, and wherein determining at least one correlation set comprises determining at least one correlation set in both of the time and frequency dimensions.

2. The method of claim 1, wherein the step of determining at least one correlation set comprises the step of selecting at least one set of signal values in the frequency dimension of the received symbols in response to the sub-position pattern.

3. The method of claim 1, wherein the step of generating a correlation set result further comprises the steps of:

storing a set of signal values for a previous symbol, wherein the signal values are products of signals in a first set of sub-carriers multiplied by corresponding the predetermined known values of pilots, and the first sub-carrier is one of the positions of pilots and the data carriers;

generating a set of signal values for the current symbol, wherein the signal values are products of signals in a second set of sub-carriers multiplied by corresponding the predetermined known values of pilots, and the second sub-carrier is one of the positions of pilots and the data carriers; and generating the correlation set result by computing the absolute value of the inner product of the set of signal values for the previous symbol and the set of signal values for a current symbol in response to the determined correlation set.

4. The method of claim 1, further comprising the step of determining a maximum of the correlation set results as a plurality of the correlation set results are generated.

5. The method of claim 4, wherein the positions of the pilots of current symbol are determined as the sub-position pattern corresponding to correlation set with the maximum correlation set result.

6. The method of claim 1, further comprising:

setting a threshold value; and determining whether the correlation set result is greater than the threshold value.

7. The method of claim 6, wherein the positions of the pilots of current symbol are determined as the sub-position pattern corresponding to correlation set with the correlation set result being greater than the threshold value.

8. An apparatus for synchronizing pilots contained in symbols received by a receiver in a multicarrier transmission system, the pilots having predetermined known values and being posited among data carriers in a frequency dimension containing the received symbols and having a predetermined position pattern in the frequency dimension, wherein the predetermined position pattern comprising a finite number of sub-position patterns each corresponding to positions of pilots contained in one of the symbols such that, the apparatus comprising:

a pilots compensator and a signal selector for determining the at least one correlation set in the frequency dimension between two sub-carriers of at least one symbol at different frequencies;

a correlator for generating one correlation set result for each of the correlation set; and a processing unit for determining positions of the pilots in response to the correlation set result, and wherein the pilots are posited among data carriers in both the frequency dimension and a time dimension containing the received symbols and having a predetermined position pattern in both of the frequency and time dimensions, and at least one correlation set in the frequency and time dimensions between at least two of the symbols can be determined.

9. The apparatus of claim 8, wherein the pilots compensator comprises a multiplier for generating a signal value that is the product of a signal in a sub-carrier of one symbol multiplied by a corresponding predetermined known value of a pilot, and the sub-carrier is one of the positions of pilots and the data carriers.

10. The apparatus of claim 8, wherein the signal selector comprises a buffer for storing a set of the signal values for a previous symbol and a set of the signal values for a current symbol.

11. The apparatus of claim 8, wherein the processing unit comprises a comparator for determining a maximum of the correlation set results as a plurality of the correlation set results are generated.

12. The apparatus of claim 11, wherein the positions of the pilots of current symbol are determined by the processing unit as the sub-position pattern corresponding to correlation set with the maximum correlation set result.

13. The apparatus of claim 8, wherein the processing unit comprises a threshold detector for determining whether the correlation set result is greater than a predetermined threshold.

14. The apparatus of claim 13, wherein the positions of the pilots of current symbol are determined by the processing unit as the sub-position pattern corresponding to correlation set with the correlation set result being greater than the predetermined threshold.

15. An apparatus for synchronizing pilots contained in symbols received by a receiver in a multicarrier transmission system, the pilots having predetermined known values and being posited among data carriers in time and frequency dimensions including the received symbols and having a predetermined position pattern in the time and frequency dimensions, wherein the predetermined position pattern comprising a finite number of sub-position patterns each corresponding to positions of pilots contained in one of the symbols such that at least one correlation set in the time and frequency dimensions between at least two of the symbols at different frequencies in response to the sub-position pattern can be determined, the apparatus comprising:

a pilots compensator and a signal selector for determining the at least one correlation set including at least two symbols at different frequencies;

a correlator for generating one correlation set result for each the correlation set; and a processing unit for determining positions of the pilots in response to the correlation set result.

16. The apparatus of claim 15, wherein the pilots compensator comprises a multiplier for generating a signal value that is the product of a signal in a sub-carrier of one symbol multiplied by a corresponding predetermined known value of a pilot, and the sub-carrier is one of the positions of pilots and the data carriers.

17. The apparatus of claim 15, wherein the correlator comprises:

a complex conjugate unit for generating conjugates of the set of signal values for the previous symbol;

a complex multiplier for generating products of the conjugate of the set of signal values for the previous symbol and the set of signal values for the current symbol; and an accumulator for generating the correlation set result by accumulating the products in response to the correlation set followed by taking the absolute value of the accumulation result.

* * * * *